US010719214B2

(12) United States Patent
Maizels et al.

(10) Patent No.: US 10,719,214 B2
(45) Date of Patent: Jul. 21, 2020

(54) ENHANCED 3D INTERFACING FOR REMOTE DEVICES (71) Applicant: Apple Inc., Cupertino, CA (US)

(72) Inventors: Aviad Maizels, Tel Aviv (IL); Alexander Shpunt, Portola Valley, CA (US); Shai Litvak, Beit-Shemesh (IL)

(73) Assignee: APPLE INC., Cupertino, CA (US)

( * ) Notice: Subject to any disclaimer, the term of this patent is extended or adjusted under 35 U.S.C. 154(b) by 335 days.

(21) Appl. No.: 15/806,350

(22) Filed: Nov. 8, 2017

(65) Prior Publication Data

US 2018/0059925 A1 Mar. 1, 2018

Related U.S. Application Data (60) Division of application No. 14/311,444, filed on Jun. 23, 2014, now abandoned, which is a continuation of application No. 12/721,582, filed on Mar. 11, 2010, now abandoned.

(60) Provisional application No. 61/159,808, filed on Mar. 13, 2009.

(51) Int. Cl.
*G06F 3/048* (2013.01)
*G06F 3/0484* (2013.01)
*G06F 3/01* (2006.01)
*G06F 3/0488* (2013.01)

(52) U.S. Cl.
CPC .......... *G06F 3/04847* (2013.01); *G06F 3/011* (2013.01); *G06F 3/017* (2013.01); *G06F 3/0488* (2013.01)

(58) Field of Classification Search
CPC .................. G06F 2203/04806; G06F 3/0481
See application file for complete search history.

(56) References Cited

U.S. PATENT DOCUMENTS

| | | | | |
|---|---|---|---|---|
| 2009/0027337 A1* | 1/2009 | Hildreth | ................. | G06F 3/011 345/158 |
| 2009/0079813 A1* | 3/2009 | Hildreth | ................. | H04N 7/147 348/14.03 |
| 2009/0124379 A1* | 5/2009 | Wells | ..................... | G07F 17/32 463/31 |
| 2010/0229125 A1 | 9/2010 | Cha | | |
| 2010/0298655 A1 | 11/2010 | McCombie et al. | | |
| 2011/0289455 A1 | 11/2011 | Reville et al. | | |

OTHER PUBLICATIONS

U.S. Appl. No. 15/434,081 Office Action dated Jul. 18, 2018.
U.S. Appl. No. 15/919,751 Office Action dated Nov. 16, 2017.

* cited by examiner

*Primary Examiner* — Thanh T Vu
(74) *Attorney, Agent, or Firm* — Kligler & Associates Patent Attorneys Ltd (57) ABSTRACT

Operating a computerized system includes presenting user interface elements on a display screen. A first gesture made in a three-dimensional space by a by a distal portion of an upper extremity of a user is detected while a segment of the distal portion thereof rests on a surface. In response to the first gesture, an area of the display screen selected by the user is identified, and a corresponding user interface element is displayed. After displaying the corresponding user interface element, a second gesture made by the distal portion is detected while the segment continues to rest on the surface so as to select one of the user interface elements that appears in the selected area.

18 Claims, 8 Drawing Sheets

ENHANCED 3D INTERFACING FOR REMOTE DEVICES

CROSS-REFERENCE TO RELATED APPLICATIONS

This Application is a division of U.S. patent application Ser. No. 14/311,444, filed Jun. 23, 2014, which is a continuation of U.S. patent application Ser. No. 12/721,582, filed Mar. 11, 2010, which claims the benefit of U.S. Provisional Application No. 61/159,808 filed Mar. 13, 2009, which is herein incorporated by reference.

BACKGROUND OF THE INVENTION

1. Field of the Invention

This invention relates generally to user interfaces for computerized systems and specifically to user interfaces with three-dimensional characteristics.

2. Description of the Related Art

Many different types of user interface devices and methods are currently available. Common tactile interface devices include the computer keyboard, mouse and joystick. Touch screens detect the presence and location of a touch by a finger or other object within the display area. Infrared remote controls are widely used, and "wearable" hardware devices have been developed, as well, for purposes of remote control.

Computer interfaces based on three-dimensional sensing of parts of the user's body have also been proposed. For example, PCT International Publication WO 03/071410, whose disclosure is incorporated herein by reference, describes a gesture recognition system using depth-perceptive sensors. A three-dimensional sensor provides position information, which is used to identify gestures created by a body part of interest. The gestures are recognized based on the shape of the body part and its position and orientation over an interval. The gesture is classified for determining an input into a related electronic device.

As another example, U.S. Pat. No. 7,348,963, whose disclosure is incorporated herein by reference, describes an interactive video display system, in which a display screen displays a visual image, and a camera captures three-dimensional information regarding an object in an interactive area located in front of the display screen. A computer system directs the display screen to change the visual image in response to the object.

SUMMARY

An embodiment of the invention provides a method for operating a computerized system, which is carried out by presenting user interface elements on a display screen of the computerized system and detecting a first gesture made in a three-dimensional space by a distal portion of an upper extremity of a user while a segment of the distal portion thereof rests on a surface. In response to the first gesture, an area of the display screen selected by the user is identified, and a corresponding user interface element is displayed. After displaying the corresponding user interface element, a second gesture made by the distal portion while the segment continues to rest on the surface is detected so as to select one of the user interface elements that appears in the selected area.

In another embodiment, the method further includes mapping an operation to the corresponding user interface element, wherein the second gesture causes the operation to be performed.

In yet another embodiment, the method further includes mapping a three-dimensional location of the distal portion of the upper extremity to two parameters of a two-dimensional parametric surface, which is a section of a sphere that corresponds to possible locations of the distal portion of the upper extremity while the segment of the distal portion rests on a surface, and mapping the two parameters to corresponding parameters in a planar two-dimensional coordinate system of the display screen where the user interface elements are located According to an aspect of the method, the first gesture describes a first arc-like movement forming at least a portion of a horizontal circular arc mapped to the section of the sphere as a pointing command, and the second gesture includes a second arc-like movement mapped to the section of the sphere as a selection command.

According to an additional aspect of the method, the pointing command includes pointing to a letter on the display screen and the selection command includes inputting the letter to the system.

According to one aspect of the method, a threshold is defined, and includes displaying a subset of letters when a magnitude of the arc-like movement is less than the threshold and inputting the letter when the magnitude of the arc-like movement is greater than the threshold.

According to an aspect of the method, the subset of letters is shifted on the display screen using a language model to determine a probability of a preferred letter, and wherein inputting the letter is performed in a single continuous motion with high probability.

According to one aspect of the method, the segment of the distal portion may include an elbow, a wrist, or a forearm.

An embodiment of the invention provides a method for operating a computerized system, which is carried out by presenting user interface elements on a display screen of the computerized system and detecting a first gesture made in a three-dimensional space by a part of a body of a user. An area of the display screen selected by the user is identified responsively to the first gesture, and a magnification level of one or more of the user elements appearing in the selected area on the display screen is increased. After increasing the magnification level, a second gesture made by the part of the body of the user is detected so as to select one of the user elements that appear in the selected area.

According to an aspect of the method, a third gesture made by the part of the body is detected, and the magnification level is decreased in response to the third gesture.

According to an additional aspect of the method, the first and the third gesture include circular motions of a hand of the user in opposite, respective directions.

According to one aspect of the method, detecting the second gesture includes actuating a shortcut on the display in response to the second gesture.

According to yet another aspect of the method, selecting the magnified alphanumeric symbol includes adding the selected magnified alphanumeric symbol to a word spelled on the display screen, wherein the method includes detecting a third gesture made by the part of the body, opposite to the second gesture, and removing one or more symbols from the word in response to the third gesture.

According to one aspect of the method, the first gesture includes a three-dimensional movement by the part of the body of the user.

According to still another aspect of the method, presenting user interface elements includes displaying a plurality of symbols arranged in at least one arc.

According to a further aspect of the method, displaying the plurality of symbols includes presenting a set of symbols in a first arc, and increasing the magnification level includes presenting a magnified subset of the set of symbols in a second arc adjacent to the first arc.

According to an aspect of the method, detecting the first gesture includes detecting an arcuate movement of a hand of the user, and associating the arcuate movement with the plurality of symbols in the at least one arc.

According to an additional aspect of the method, presenting user interface elements includes presenting a sequence of textual characters, and increasing the magnification level includes displaying further characters for addition to the sequence using a language model to select the further characters.

According to another aspect of the method, detecting the first gesture includes scrolling forward or backward along the sequence responsively to first movements of a hand of the user in first and second directions along the sequence, and detecting the second gesture includes selecting the further characters for addition to the sequence in response to second movements of the hand in at least a third direction perpendicular to the first and second directions.

An embodiment of the invention provides a computer software product for operating a computer system, including a sensing device, which is configured to detect at least a part of a body of a user, a display screen, which is configured to present user interface elements, and a processor, which is coupled to the sensing device so as to detect a first gesture made in a three-dimensional space by the part of the body. The processor is additionally configured to identify an area of the display screen selected by the user in response to the first gesture, and to increase a magnification level of one or more of the user interface elements appearing in the selected area on the display screen, and after increasing the magnification level, to detect a second gesture made by the part of the body so as to select one of the user interface elements that appears in the selected area.

An embodiment of the invention provides a computer software product for operating a computerized system, including a computer storage medium in which computer program instructions are stored, which instructions, when executed by a computer, cause the computer to present user interface elements on a display screen of the computerized system, to detect a first gesture made in a three-dimensional space by a part of a body of a user, to identify an area of the display screen selected by the user in response to the first gesture, and to increase a magnification level of one or more of the user interface elements appearing in the selected area on the display screen. After increasing the magnification level, the instructions cause the computer to detect a second gesture made by the part of the body of the user so as to select one of the user interface elements that appears in the selected area.

There is also provided, in accordance with an embodiment of the present invention, a method for operating a computerized system, including the steps of presenting user interface elements on a display screen of the computerized system and detecting a gesture made in a three-dimensional space by a part of a body of a user. While the user performs the gesture, one or more of the user interface elements on the display screen are continuously modified responsively to a direction of the gesture.

In some embodiments, continuously modifying the one or more of the user interface elements includes increasing or decreasing a magnification level of at least one of the user interface elements, typically by zooming in on a user interface element toward which the gesture is directed.

In other embodiments, presenting the user interface elements includes presenting a sequence of textual characters, which is continuously modifying by adding characters to the sequence while scrolling over the sequence responsively to the gesture. Adding the characters typically includes presenting choices of further characters to add to the sequence, using a language model to determine the choices, and selecting at least one of the choices responsively to the gesture. Presenting the choices may include determining, based on the language model, a respective likelihood of correctness of each of the choices, and displaying the choices so that an effort required by the user to select a given choice is a decreasing function of the likelihood. Additionally or alternatively, continuously modifying the one or more of the user interface elements may include scrolling forward or backward along the sequence responsively to first movements of a hand of the user in first and second directions along the sequence, and selecting further characters for addition to the sequence responsively to second movements of the hand in at least a third direction perpendicular to the first and second directions.

BRIEF DESCRIPTION OF THE SEVERAL VIEWS OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION

In the following description, numerous specific details are set forth in order to provide a thorough understanding of the various principles of the present invention. It will be apparent to one skilled in the art, however, that not all these details are necessarily always needed for practicing the present invention. In this instance, well-known circuits, control logic, and the details of computer program instructions for conventional algorithms and processes have not been shown in detail in order not to obscure the general concepts unnecessarily.

Overview.

Embodiments of the present invention that are described hereinbelow provide improved methods, products and systems for providing remote input to an electronic device. When a user interacts remotely with a device that requires accurate input and navigation decisions, these embodiments provide an intuitive and streamlined interface.

Remote input may be provided for interaction with a remote device such as a gaming console, an interactive television, a computerized cellular phone, or a computer. In the context of the present application and claims, the term "remote device" herein refers to any remotely governable device containing a processing unit. A sensing device may be used to detect a virtual control, such as a virtual keyboard. The sensing device is typically a three-dimensional camera that detects information that includes the position of a body (or at least parts of the body) of the user or other tangible entities wielded or operated by the user for interacting with a computer application running on the remote device, all of which are sometimes referred to herein for convenience as "control entities". The sensing device detects the presence and changes of position of a control entity, i.e. its speed and direction. The remote device interprets movements detected by the sensing device as described hereinbelow.

The virtual control is positioned in front of the user, usually between the user and a display. The remote device presents user interface elements on the display. The sensing device detects the movements of the control entity in a three-dimensional space, such as a user's hand manipulating the virtual control, and translates them into commands for the remote device. For example, movement of the control entity using a circular gesture may be interpreted by the remote device as a command to adjust a magnification (or zoom) level of a remote information input interface comprising the user interface elements on the display. "Magnification" in this context is not limited to simple visual magnification: New details or relevant potentially selected options may be exposed. In movements referred to herein as "3-dimensional" movements, a distance between the control entity and the sensing device varies as a gesture, e.g., the circular gesture, is performed. Movements in which the distance between the control entity and the sensing device remains substantially constant are classified as either "1-dimensional" or "2-dimensional movements". Performing a clockwise circular gesture with the control entity may command the remote device to increase the magnification level of the display, whereas a counter-clockwise circular movement may cause minification. The terms "clockwise" and "counterclockwise" are used arbitrarily herein to distinguish two meaningful gestures. These terms have no necessary physical meanings with respect to the actual configuration of the embodiments.

Thus, by interpretation of the user's gestures, the remote device causes the interface to zoom in and out, with a potentially infinite zoom range. The actual distance between the user and the remote device, however, remains largely constant. Conceptually, the result of this arrangement is that the interface is essentially three-dimensional, and the elements of the interface may be continuously regrouped in three-dimensional space so as to move toward or away from the user as required, depending on the direction of the user's gesture. Thus, for example, the display may zoom in on a user interface element toward which a gesture is directed. This zoom may continue until the user's hand reaches the virtual location of the user element in the three-dimensional space, whereupon the element is selected (with or without an additional selection gesture).

In other embodiments of the invention, the virtual control may be a virtual keyboard for remote information input, such as remote text input. The display presents a remote information input interface representing the virtual keyboard. The symbol positions, e.g., the relative positions of the letters in the virtual keyboard, may be held constant. The relative size of the symbols may be varied on the display in response to movements by the control entity. The distance of the control entity from the sensing unit and the relative motion of the control entity with respect to the sensing unit may be interpreted as a manipulation of the virtual control, and hence as commands to the remote device as described hereinbelow. The virtual control may be interpreted by the remote device to be constructed or oriented so as to accommodate right or left handed operation as the case may be. The positions of the symbols in the virtual keyboard may be held constant, while the relative size of the symbols may be varied to reflect expected relevance or likelihood of each symbol being a suggested next symbol for remote input, e.g., based upon context awareness.

Movement of the control entity forward towards the sensing unit may cause a selected symbol, e.g., a letter to be input. Movement of the control entity away from the sensing unit may cause the previously input symbol to be erased. Selection is typically performed in two stages. A first selection stage may be used to determine a specific group of symbols. A second selection stage is used to input an individual symbol from the specific group of symbols. In some embodiments, the first selection stage is made by an arc-like movement of the control entity, e.g., clockwise or counter-clockwise, followed by a slight movement towards the sensing unit. A threshold, which may be fixed or adaptive, is defined to enable the remote device to detect completion of each selection stage. The remote device interprets a movement with a magnitude less than the threshold as completion of the first selection stage. When the magnitude of the movement is greater than the threshold, the remote device interprets the movement as completion of the second stage. The values of the threshold may depend upon the resolving capabilities of the sensing device, and are typically set so as to detect significant motion, while ignoring "jitter" by the control entity. In some cases, there is no pause between the stages, e.g., when a single continuous movement is performed. The second selection stage may constitute an additional arc-like movement by the control entity towards the sensing unit and downwards, as described in more detail hereinbelow.

Selection stages may be combinations of continuous and discrete, curved and linear movements in many directions with respect to the sensing unit. In any case the user can execute the combinations while resting his elbow (or other relatively proximal segment of his upper extremity, e.g., a wrist or forearm) on a surface such as an armrest of a chair or a table, while using a distal portion as the control entity. Thus, the selection may be performed by the user's hand, fingers or forearm, or combinations thereof without tiring the arm.

To illustrate additional gestures by way of example and not of limitation, dropping the control entity downwards could be interpreted as a command to begin a new line, a new paragraph, or to input a highlighted symbol. Hovering the control unit longer than an activation threshold may stimulate an autocomplete feature to offer suggestions to complete a word or a sentence, thus causing several shortcuts to be shown on the display. In the context of the present application and claims, the term "shortcut" herein refers to an option on a remote information input interface that appears upon user interaction, which offers a choice that is available in the current state, or context, of the computer application. That is to say, a user interface element, e.g. a shortcut, may be mapped to an operation to be performed upon selection of the shortcut. For example, the operation may cause the word shown in the shortcut to be input to the remote device. Common examples of such shortcuts include a context menu that appears upon a mouse click operation such as a "right-click", and an iconic link whose activation triggers some function in a remote device. The activation threshold may be customized to vary according to specific symbols and application scenarios. The display may be altered to reflect potential likelihood or relevance of a next letter, group of letters, or symbol based upon an analysis of previously input symbols, e.g., by highlighting likely symbols on the display. A subset of letters may be shown on the display to simplify navigation, and may themselves be linked to shortcuts. The relative location of the subset of letters may be shifted on the display so as to enable the user to select a preferred letter in a single selection motion. Typically, the relative location of the subset of letters is altered without any change to the order of the letters.

In yet other embodiments, the distance and motion relative to the display unit, rather than to the sensing unit, are used for interpreting the commands.

System Description.

Figure 1:
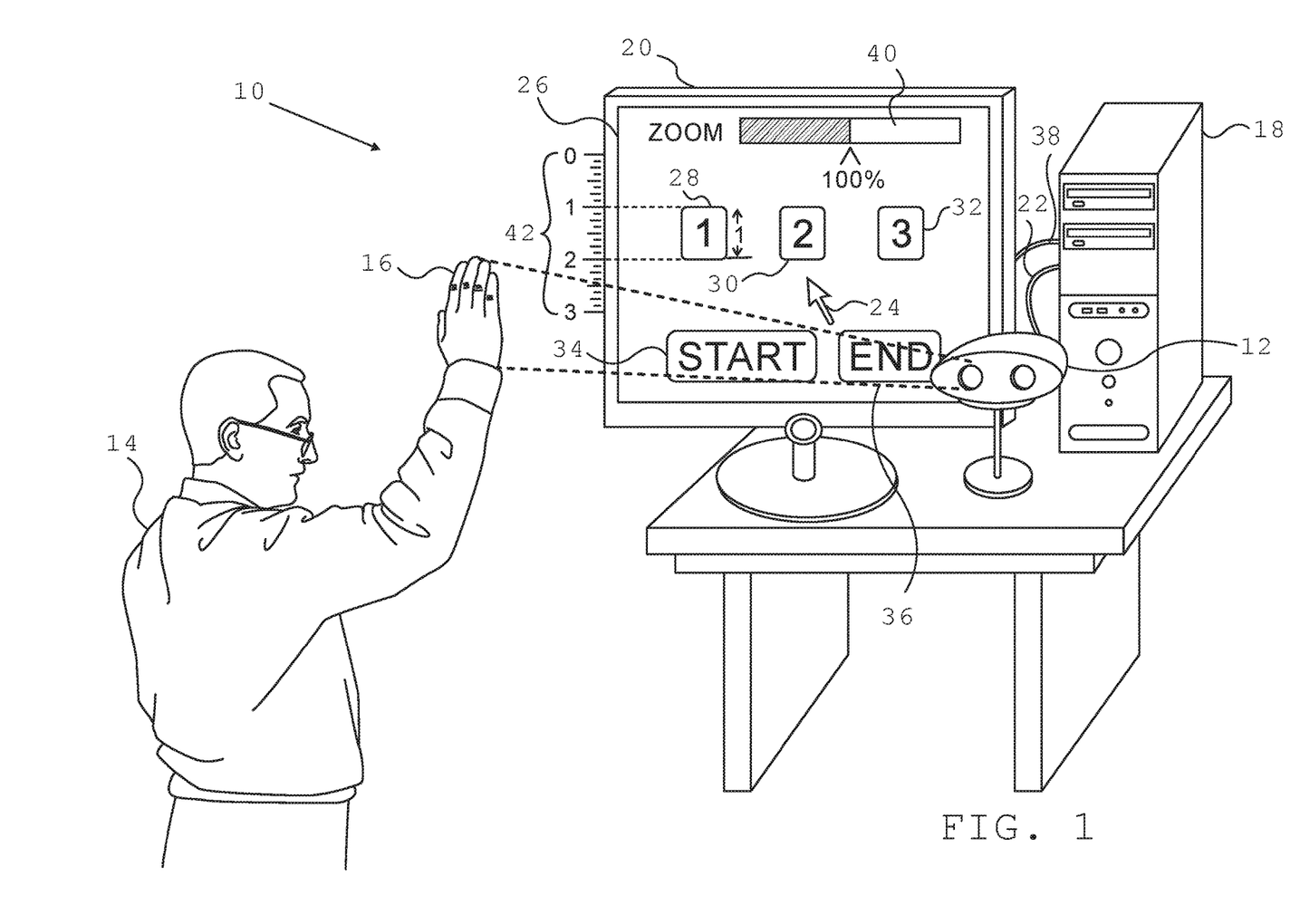
FIG. 1 is a schematic, pictorial illustration of a system for remote gesture-mediated information input, in accordance with an embodiment of the present invention.

Turning now to the drawings, reference is initially made to FIG. 1, which is a schematic, pictorial illustration of a system 10 for gesture-mediated remote information input, in accordance with an embodiment of the present invention. System 10 incorporates a sensing device 12, typically a three-dimensional camera, which detects information that includes the body (or at least parts of the body) of a user 14 or other control entities for controlling a computer application as described hereinabove. For the purposes of illustration, the control entity is described using an example of a hand 16 for providing remote input to system 10. In gaming applications, such control entities could include portions of objects being manipulated by user 14, e.g., as hockey sticks, golf clubs, bows, and tennis rackets. The arrangement described in commonly assigned application Ser. No. 12/352,622, filed Jan. 13, 2009, which is hereby incorporated by reference, is suitable for use in system 10 as sensing device 12. Other known three-dimensional cameras may also be employed as sensing device 12. Although this embodiment relates to one particular system for providing remote information input, the principles of providing remote information input that are implemented in system 10 may similarly be applied, mutatis mutandis, in other types of remote information input or gesture control systems, using other techniques for providing remote information input or remote control via specialized gesture.

Information detected by sensing device 12 is processed by a remote device 18, which drives a display screen 20 accordingly. Sensing device 12 is connected to remote device 18 via a sensing interface 22, which may comprise a Bluetooth® adapter, an Infrared Data Association (IrDA) device, a cable connection, a universal serial bus (USB) interface, or any communication interface for outputting sensor data that allows remote device 18 to import remote sensing data. Remote device 18 typically comprises a general-purpose computer processor, which is programmed in software to carry out the functions described hereinbelow. The software may be downloaded to the processor in electronic form, over a network, for example, or it may alternatively be provided on tangible storage media, such as optical, magnetic, or electronic memory media. Alternatively or additionally, some or all of the image functions may be implemented in dedicated hardware, such as a custom or semi-custom integrated circuit or a programmable digital signal processor (DSP). Although remote device 18 is shown in FIG. 1, as a separate unit from sensing device 12, some or all of the processing functions of remote device 18 may be performed by suitable dedicated circuitry within the housing of sensing device 12 or otherwise associated with sensing device 12.

Display screen 20 presents user interface elements comprising a pointer 24 and a remote information input interface 26, which comprises symbols 28, 30, 32, 34, 36. A display interface 38 connects display screen 20 to remote device 18, and may comprise a Bluetooth® adapter, an IrDA device, a cable connection, or any communication interface for outputting image data that allows remote device 18 to export visual display data, e.g., in the form of a compressed image. The symbol selection layout provides a simplified example for the purposes of illustration. In the present example, symbols 28, 30, 32 represent numerals, whereas symbols 34 and 36 represent actions. Each symbol may be remotely selected or actuated to control the computer application. Remote information input interface 26 may also comprise a zoom level indicator 40 to provide a visual indicator of the zoom level of remote information input interface 26. Zoom level indicator 40 may be shown as a slider, similar to sliders utilized in web browsers and other applications. The zoom level is typically allowed to range within certain limits, e.g., from 50% to 500%. In the example of FIG. 1, zoom level indicator 40 shows an initial value of 100%. A scale indicator 42 shows symbols 28, 30, 32 having an initial height of one unit on remote information input interface 26.

Specialized Gestures.

Figure 2:
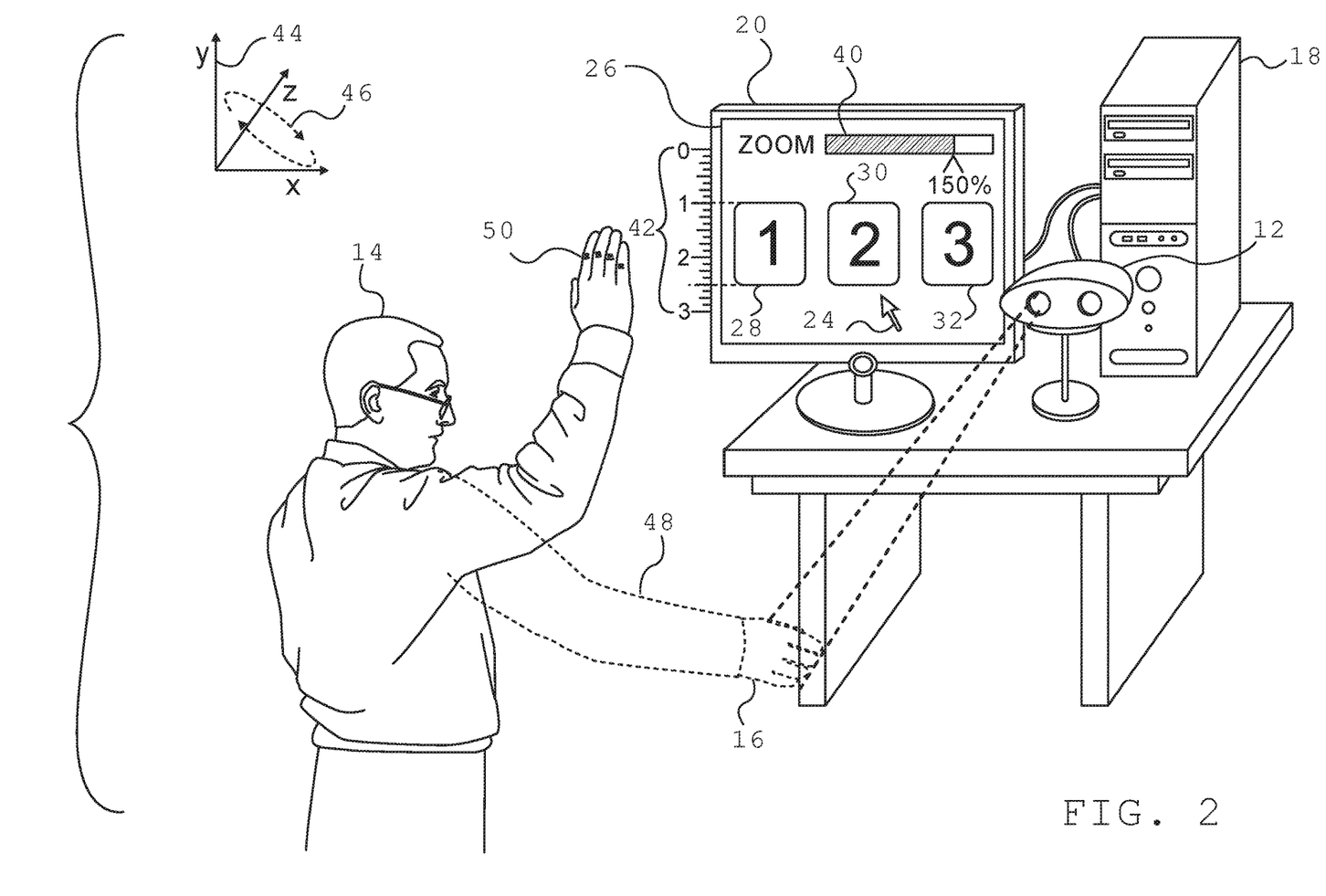
FIG. 2 is a view of portions of a system operating under remote control of a user in accordance with an embodiment of the present invention.

Reference is now additionally made to FIG. 2, which is a view of portions of system 10 (FIG. 1) operating under remote control of user 14 in accordance with an embodiment of the present invention. FIG. 1 and FIG. 2 may be viewed as a sequence of actions. In FIG. 1, user 14 is about to perform a specialized gesture, and in FIG. 2 completes the gesture. User 14, who is typically viewing display screen 20, performs the specialized gesture, e.g., a clockwise circular gesture from the perspective of user 14, using hand 16 as described on a reference coordinate system 44 by directed broken lines 46. Alternatively, other types of hand movements may be used to invoke image zoom and other functions, such as moving the hand toward and away from the display screen. In reference coordinate system 44 the x, y, and z axes are to be interpreted as horizontal, vertical, and depth coordinates, respectively, with respect to sensing device 12. Thus, the distance between hand 16 and sensing device 12 vary as the specialized gesture is performed.

The inclination of the plane of the circle may be significant, according to specifications programmed in remote device 18. Thus, a circle described vertically in the yz plane may be interpreted by remote device 18 differently from a circle in the xy plane or a horizontally executed circular gesture, e.g., as a pointing command. Substantially circular gestures described in various oblique planes may be given even more specialized interpretations. The clockwise circular gesture is recognized by sensing device 12, and remote device 18 interprets the gesture as a zoom command. The clockwise circular gesture thus commands remote device 18 to smoothly increase the zoom (or magnification) level of remote information input interface 26 on display screen 20 using pointer 24 as a reference point for the zooming. That is to say, remote device 18 identifies an area of display screen 20 around pointer 24 as having been selected by user 14 for the zoom command. By performing the gesture, hand 16 may move from an initial position 48 to a final position 50. Scale indicator 42 shows symbols 28, 30, 32 having a final height of 1.5 units on remote information input interface 26.

In a similar fashion, counter-clockwise circular gestures may be interpreted by remote device 18 as a command to decrease the zoom level. In the example of FIG. 2, zoom level indicator 40 shows that, in comparison with FIG. 1, the clockwise circular gesture has increased the zoom level from the initial value of 100% immediately prior to the gesture to a final value of 150%. A corresponding increase in the size of symbols 28, 30, 32 is shown on display screen 20 as a result of the zoom command. That is to say, one or more of the user interface elements appearing in the selected area on display screen 20 are magnified.

Figure 3:
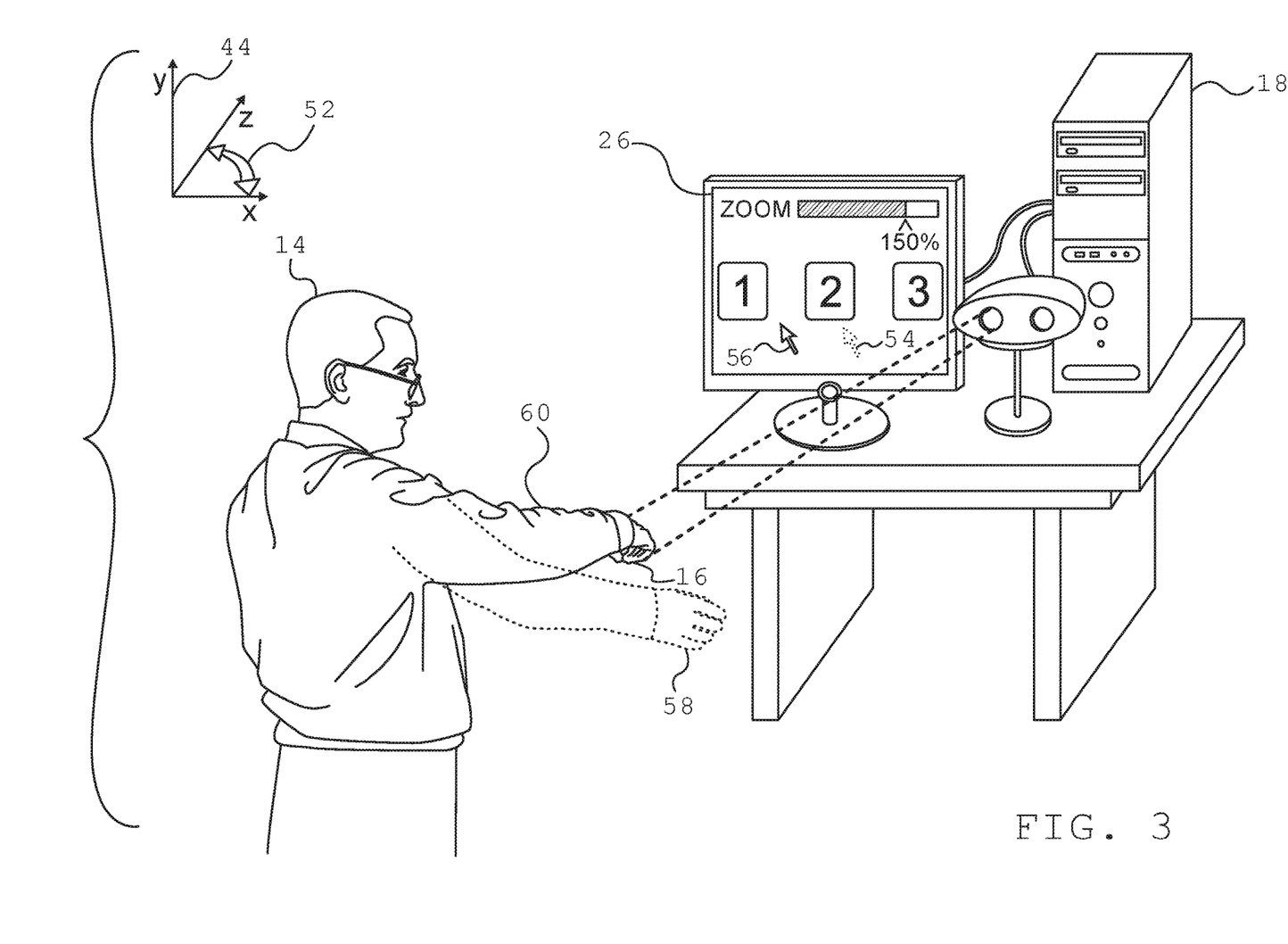
FIG. 3 is a view of portions of a system operating under remote control of a user in accordance with an embodiment of the present invention.

Reference is now made to FIG. 3, which is a view of portions of system 10 (FIG. 1) operating under control of user 14 in accordance with an embodiment of the present invention. In the example of FIG. 3, user 14 performs a leftward, substantially horizontal gesture using hand 16 as indicated by an arrow 52 on reference coordinate system 44. The leftward gesture commands remote device 18 to move pointer 24 to the left on remote information input interface 26. In the example of FIG. 3, the leftward movement of pointer 24 (FIG. 2) executes from a first position (indicated by a cursor 54 (shown in broken outline) to a second position, indicated by a cursor 56 (shown in solid outline) as a result of the command. By performing the gesture, hand 16 may move from an initial position 58 to a final position 60.

A rightward gesture may be interpreted as a command to move pointer 24 to the right from the perspective of user 14, while gestures performed upward and downward may similarly be interpreted by remote device 18 as commands to move pointer 24 upward and downward, respectively.

Suitable calibration of sensing device 12 and remote device 18 assures a desired sensitivity, i.e., a correspondence between a spatiotemporal displacement of the control entity and the effect on elements shown on remote information input interface 26. It is recommended to compensate for the viewing distance and viewing angle of user 14 using known methods. The compensation techniques described in U.S. Patent Application Publication No. 2009/0009593, entitled "Three-dimensional Projection Display" may be applied for this purpose.

Remote Information Input.

Figure 4:
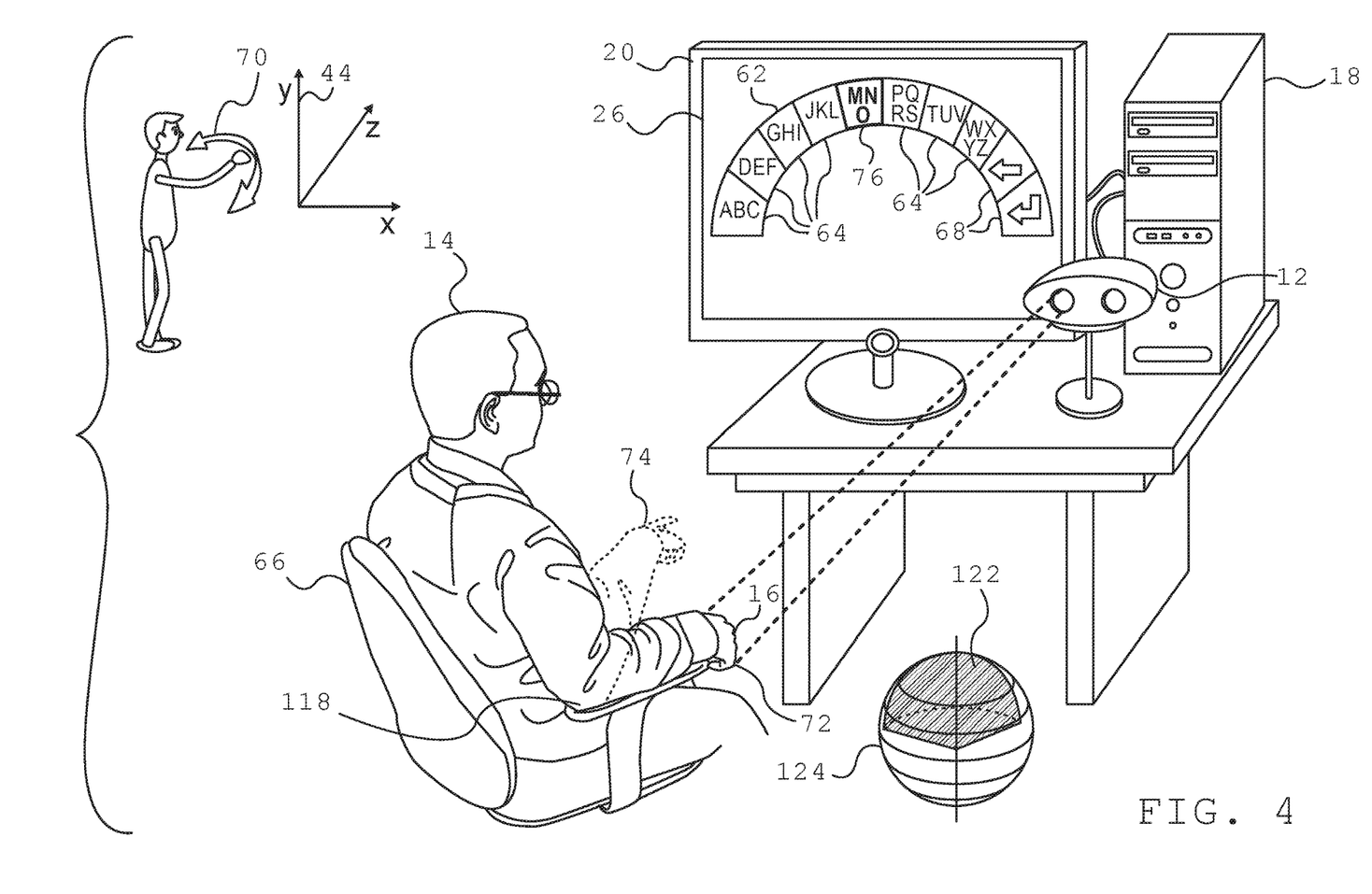
FIG. 4 is a schematic, pictorial illustration of a system for remote information input, in accordance with an embodiment of the present invention.

Reference is now made to FIG. 4, which is a schematic, pictorial illustration of system 10 (FIG. 1) for remote information input, in accordance with an embodiment of the present invention. A first symbol arc 62 is shown within remote information input interface 26 on display screen 20, in an embodiment that implements a T9® text input layout. T9 text input represents "text on 9 keys," a method for streamlining input of text on numeric keypads, typically for mobile devices, available at the T9 web site (t9.com). Many suitable variations will occur to those skilled in the art for streamlining information input by providing an improved symbol layout on remote information input interface 26. First symbol arc 62 comprises an arcuate, nearly semi-circular display of groups of alphanumeric symbol buttons 64 to simulate relaxed movement of hand 16 while user 14 sits comfortably on a chair 66. First symbol arc 62 may comprise additional symbol buttons 68 to support input of special symbols, e.g., space, backspace, or carriage return.

As user 14 moves a control entity, such as hand 16 usually, but not necessarily while seated, and typically in a horizontal arc-like movement as indicated by an approximately semicircular arc 70 adjacent to reference coordinate system 44. Sensing device 12 detects the movement and remote device 18 interprets the movement by highlighting each of additional symbol buttons 68 and alphanumeric symbol buttons 64 sequentially as hand 16 moves through semi-circular arc 70 from a first position 72 to a second position 74. Provision of an arcuate display enables hand 16 to move while an elbow 118 of the same upper extremity as hand 16 rests on chair 66. A portion of a sphere 122 is shaded within a spherical coordinate system 124 using an axis based upon elbow 118 to indicate an approximate range of motion of hand 16 when elbow 118 rests on a surface. In the arrangement of FIG. 4, a three-dimensional space is mapped to spherical coordinate system 124, and is also mapped to a two-dimensional coordinate system. The latter can be conveniently appreciated as a plane in reference coordinate system 44.

It is recommended that the movement of semi-circular arc 70 be parallel to the xy plane in reference coordinate system 44. However, the movement may also be made so that the angle between a plane of the motion of semi-circular arc 70 and the xy plane is above 0 degrees, typically up to 45 degrees. In the example of FIG. 4, an emphasized symbol button 76 is shown on display screen 20 to indicate that performance of a second gesture, described hereinbelow as a selection gesture, will result in selection of the symbols displayed therein. That is to say, remote device 18 identifies emphasized symbol button 76 as the area of display screen 20 that is currently selected by user 14. Corresponding selection gestures performed by hand 16 at other points along semi-circular arc 70 would select corresponding symbols of first symbol arc 62. The first gesture and the second gesture may be recognized by remote device 18 according to time-varying coordinates on the two-dimensional coordinate system and the spherical coordinate system, respectively.

Figure 5:
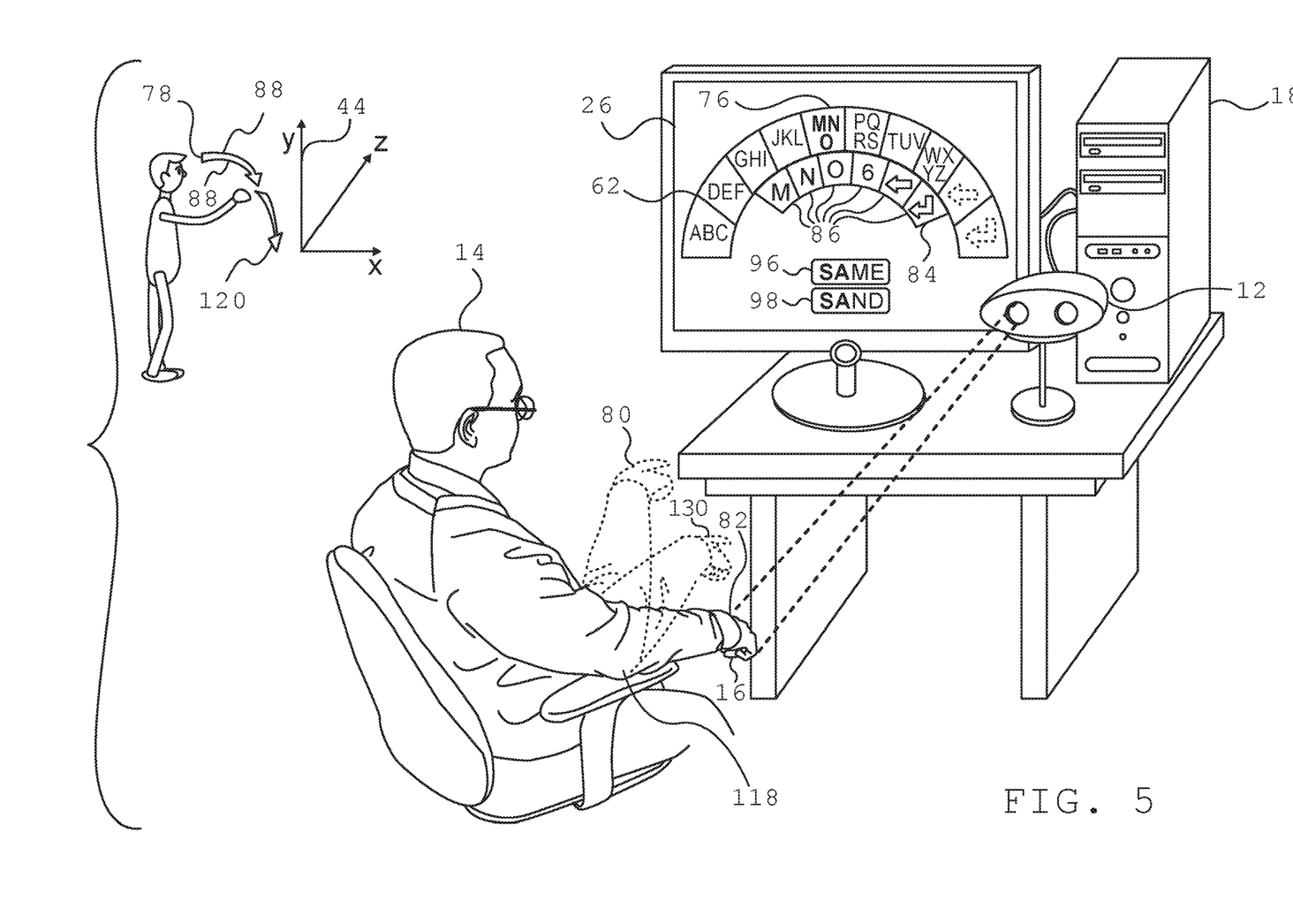
FIG. 5 is a view of portions of a system operating under remote control of a user in accordance with an embodiment of the present invention.

Reference is now additionally made to FIG. 5, which is a view of portions of system 10 (FIG. 1) operating under remote control of user 14 in accordance with an embodiment of the present invention. The selection gesture is typically performed in two stages, as described hereinabove. User 14 may perform a first stage of the selection gesture by moving hand 16 downward in a vertical arc 78 generally directed toward display screen 20. Remote device 18 uses the threshold, described hereinabove, to determine completion of each selection stage. The selection gesture may pivot about the elbow or shoulder, whichever is applicable. Of course, when pivoting about the shoulder the advantages of resting a portion of the arm on a surface are lost. By performing the selection gesture, hand 16 may move from an initial position 80 to an intermediate position 130 while performing the first stage, and then to a final position 82 while performing a second stage. Sensing device 12 detects the movement, and remote device 18 interprets the selection gesture as a command to display a second symbol arc 84 directly below first symbol arc 62, comprising individually delineated symbol buttons 86, which are grouped together in highlighted symbol button 76. In the present example, user 14 next moves hand 16 in another arc-like movement, which is detected by sensing device 12. Remote device 18 interprets the movement by highlighting each of individually delineated symbol buttons 86 as described hereinabove. User 14 may then perform the second stage of the selection gesture by moving hand 16 further downward to remotely input one of individually delineated symbol buttons 86. The second stage of the selection gesture is indicated by a further downwardly directed vertical arc 120. Hand 16 may move from intermediate position 130 to final position 82 while performing the second stage. FIG. 4 and FIG. 5 may be viewed as a sequence of actions, whereby in FIG. 4 user 14 selects an area of display screen 20, e.g., one of additional symbol buttons 68, and in FIG. 5 selects one of the user interface elements, e.g., highlighted symbol button 76, in order to display second symbol arc 84 and to input one of individually delineated symbol buttons 86.

Use of arcuate displays like first symbol arc 62 for remotely inputting information may provide particularly enhanced ergonomic value. The motions involved in their use for remote information input are not fatiguing, e.g., in comparison with a standard "QWERTY" keyboard layout. Virtual keyboard layouts such as the QWERTY keyboard layout may not as conveniently permit remote information input with a resting or fixed elbow position.

As noted above, the selection gesture is made by moving hand 16 downwards. That is, it involves a forward displacement of the hand in the z-axis with respect to sensing device 12. There are two variants of the motion. In one case user 14 may move hand 16 towards the center (origin) of spherical coordinate system 124 (FIG. 4), such that the motion involves both a component in the xy plane and a component in yz plane. In the other case, user 14 may move hand 16 directly downwards, such that only a component in the yz plane exists. In both cases, remote device 18 is able to distinguish the selection gesture from other linear or curved movements in the xy plane alone, by calculating the displacement of the hand along the z-axis. When the magnitude of the motion component in the z-axis is greater than another predefined threshold, remote device 18 interprets the movement as a selection gesture and ignores the motion component in the xy plane. In both cases, remote device 18 may provide enhanced ergonomic value when recognizing these selection gestures, as they allow user 14 to use a natural selection motion, as indicated by the location of hand 16 on the xy axis.

If user 14 causes pointer 24 (FIG. 1) to hover over second symbol arc 84, remote device 18 may cause a corresponding user interface element, e.g., shortcuts 96, 98 to be shown on remote information input interface 26, offering suggestions for completing a word. In the example of FIG. 5, letters "S" and "A" have been previously input, and the autocomplete feature of remote device 18 provides shortcuts 96 and 98 for selection. Previously input information may be emphasized on shortcuts 96 and 98.

Figure 6:
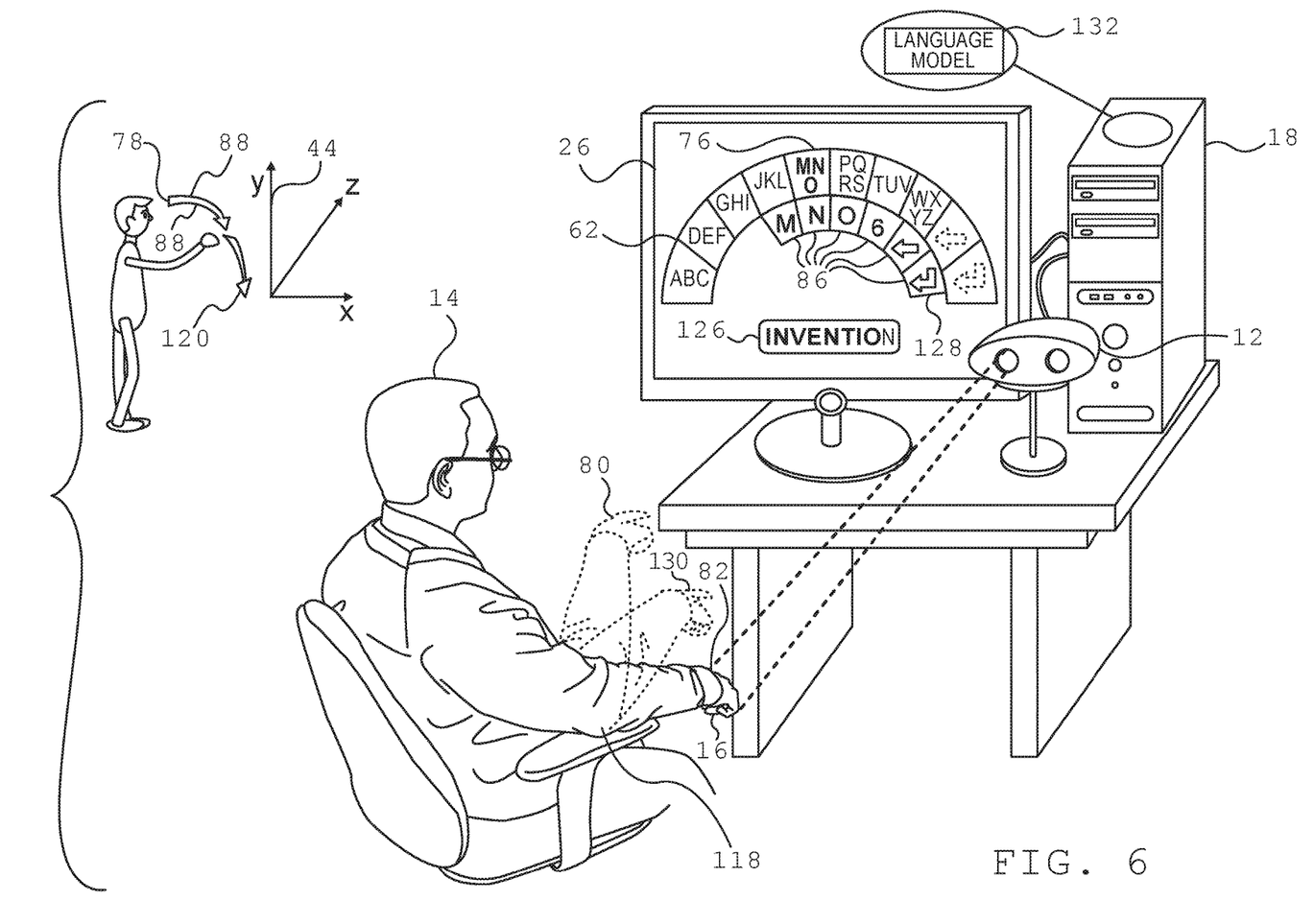
FIG. 6 is a view of portions of a system operating under remote control of a user in accordance with an embodiment of the present invention.

Reference is now made to FIG. 6, which is a view of portions of system 10 (FIG. 1) operating under remote control of user 14 in accordance with an embodiment of the present invention. A domain-specific language model 132 may be used to determine the probability of a symbol or next letter being preferred by user 14. In the example of FIG. 6, language model 132 is shown as a computer program module operated by device 18. In the example of FIG. 6, user 14 has previously input the letters "INVENTIO". User 14 next moves hand 16 over emphasized symbol button 76. Device 18 uses the domain-specific language model and determines that the probability of a letter "N" is significantly higher than another letter shown in emphasized symbol button 76, as shown in a shortcut 126. In some embodiments device 18 uses the domain-specific language model to shift an adjusted second symbol arc 128 to place the letter with a highest probability beneath emphasized symbol button 76. Both stages of the selection gesture may be performed by user 14 in a continuous motion to select a preferred letter, thus minimizing required movement by hand 16. In the context of the present application and claims, the term "language model" herein refers to any suitable statistical model for assigning a probability to a sequence of letters or words by means of a probability distribution.

Figure 7:
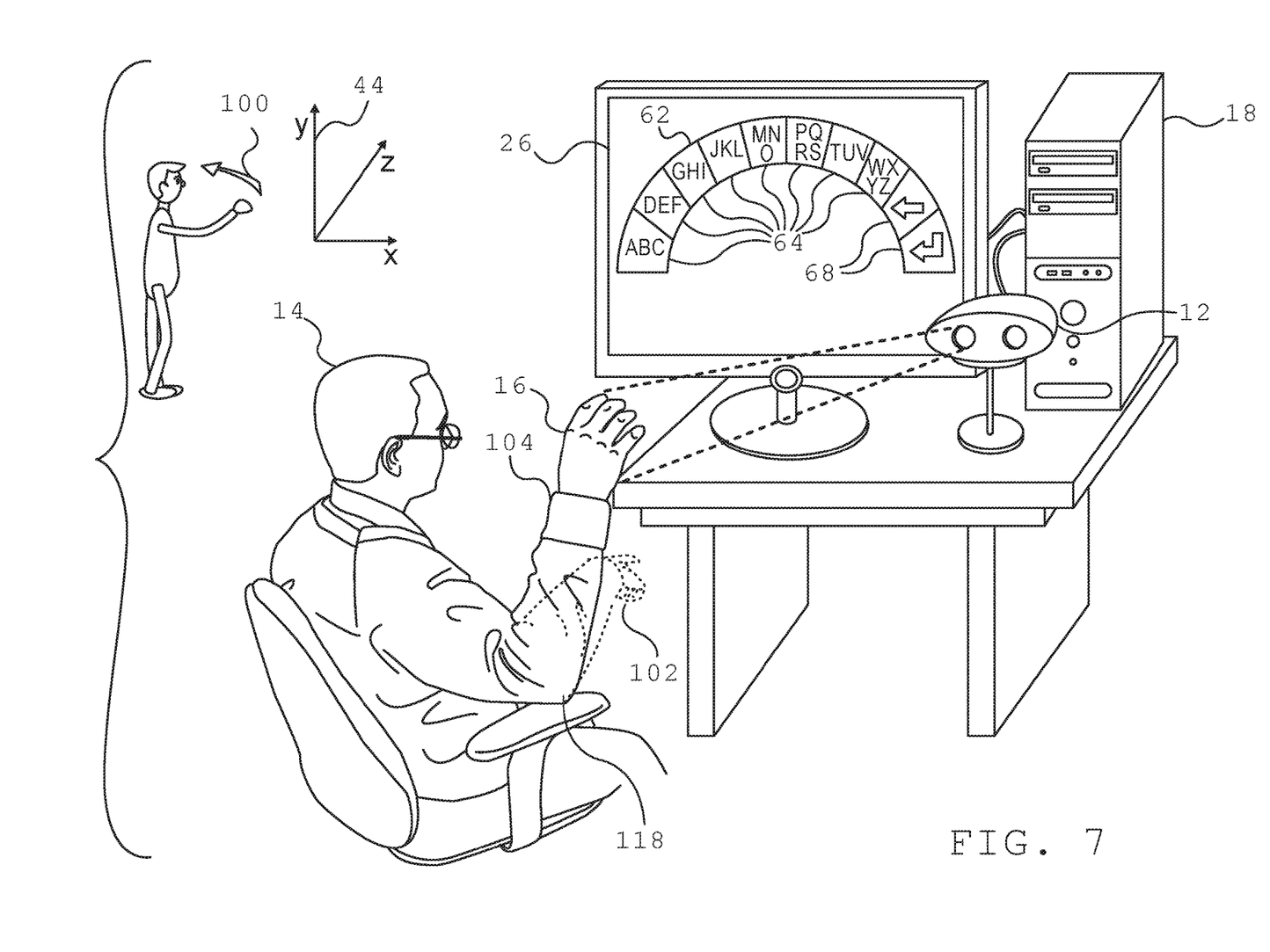
FIG. 7 is a view of portions of a system operating under remote control of a user in accordance with an embodiment of the present invention.

Reference is now made to FIG. 7, which is a view of portions of system 10 (FIG. 1) operating under remote control of user 14 in accordance with an embodiment of the present invention. User 14 may choose to perform a deselection gesture after inputting information remotely, or to deselect second symbol arc 84. The deselection gesture may comprise raising hand 16 as indicated by an upwardly directed vertical arc 100 which is a reversal of vertical arc 78 (FIG. 5). Sensing device 12 detects the deselection gesture, and remote device 18 interprets the movement as a command to cancel the selection of second symbol arc 84 (FIG. 5) which has responsively been removed from remote information input interface 26 in FIG. 7. Thereafter, any movement by hand 16 after the deselection gesture has been performed is interpreted by remote device 18 as a command to resume highlighting alphanumeric symbol buttons 64 on first symbol arc 62 for selection. In performing the deselection gesture, hand 16 moves from an initial position 102 to a final position 104.

In alternative embodiments, after user 14 performs the above-described selection gesture, remote device 18 automatically removes second symbol arc 84 without requiring the deselection gesture to be performed. Thus, remote information input requires less movement by user 14 than in the previous embodiment. Device 18 typically requires user 14 to return hand 16 to final position 104 before recognizing a new selection.

Embodiments of the present invention that utilize the T9 text input layout as symbol arcs on remote information input interface 26 may provide an advantage whereby input is provided remotely without the need to move the control entity in three dimensions. As described hereinabove, moving hand 16 in an arcuate motion along semi-circular arc 70 (FIG. 4) is interpreted by remote device 18 as movement within two dimensions, e.g., leftward, rightward, upward and downward. By limiting semi-circular arc 70 to motions substantially parallel to the xz plane, 3-dimensional interpretation issues are avoided. A complex movement in three dimensions, e.g., to perform the point-and-click gesture, is not required, thus simplifying interpretation of the gesture and thereby facilitating remote information input.

Remote Interfacing Via Specialized Gestures.

Figure 8:
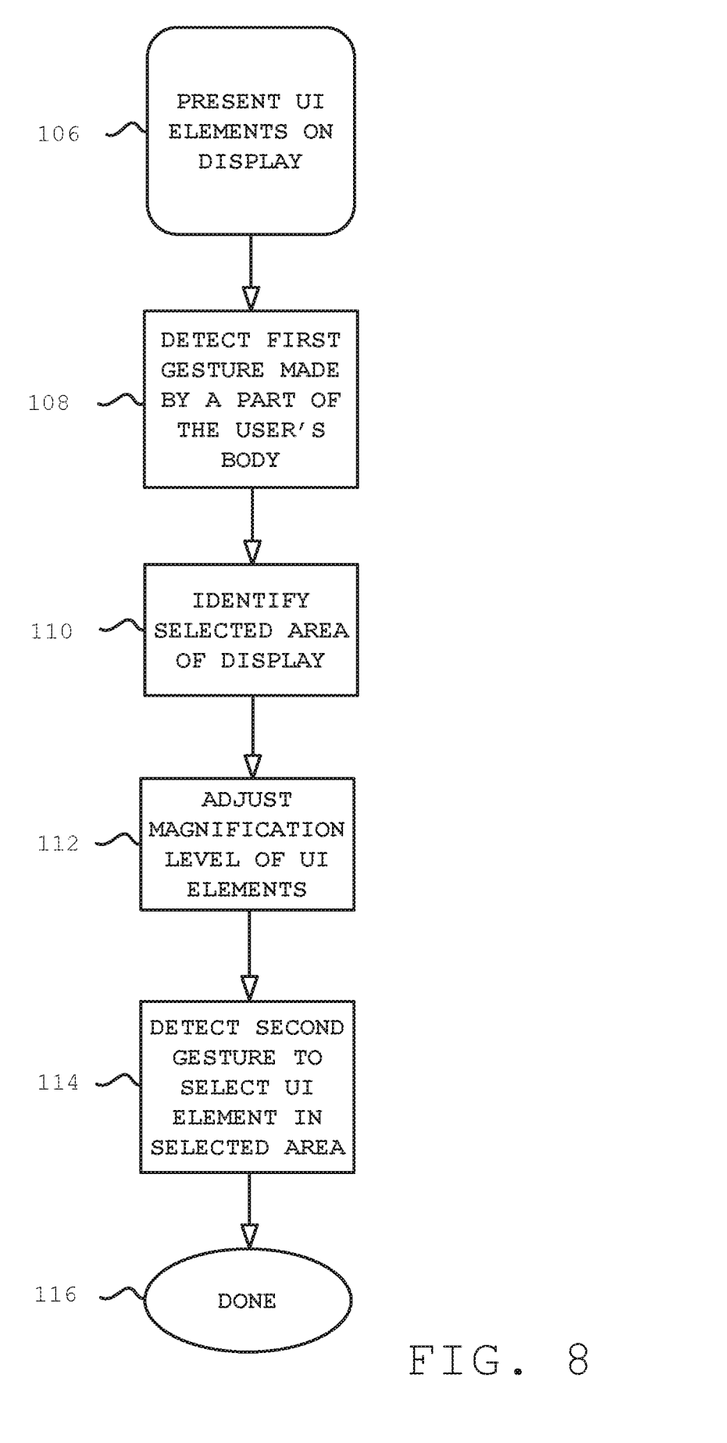
FIG. 8 is a flow chart of a method for remotely interfacing with a computer system, in accordance with an embodiment of the present invention.

Reference is now made to FIG. 8, which is a flow chart of a method for remotely interfacing with a computer system, in accordance with an embodiment of the present invention. Shown by way of example, user 14 (FIG. 1) may need to search a large volume of media without using a physical keyboard or other interface connected to a remote device. User 14 would thus need to perform efficient, streamlined search commands to interact remotely with a computer application running on the remote device. The process steps are described below in a particular linear sequence for clarity of presentation. However, it will be evident that some of them can be performed in parallel, asynchronously, or in different orders. The process can be performed, for example, by system 10.

User interface elements comprising a remote information input interface to a computer application are presented to a user on a display screen in a display presentation step 106. The computer application may be a media search and presentation system. It is assumed that the computer application has been loaded, and that a three-dimensional sensing device is in operation. The sensing device can be any three-dimensional sensor or camera, provided that it generates data for interpretation by the remote device.

The user performs a first gesture in a three-dimensional space using a control entity, e.g., a part of the user's body. A sensing device, such as sensing device 12 (FIG. 1), detects the gesture made by the control entity, e.g., hand 16, in a gesture detecting step 108. The computer iteratively analyzes three-dimensional data provided by the sensing device, for example by constructing a three-dimensional map as described in commonly assigned co-pending U.S. application Ser. No. 12/683,452, which is herein incorporated by reference. In response to the detected gesture, an area of the display screen is identified by the computer in a selected area identification step 110.

The first gesture is recognized by the computer as a command to increase the magnification level of user interface elements within the selected area on the display screen in a magnification level adjusting step 112. Any gesture recognition algorithm may be employed to carry out magnification level adjusting step 112, so long as the system can relate the user gesture to a recognized command and a location of interest on the remote information input interface.

A second gesture is recognized by the computer as a command to select one of the user interface elements within the selected area in a selection gesture detecting step 114. The second gesture can be for any purpose, for example to perform another zoom command, to input a symbol, or to alter the remote information input interface in accordance with the gesture identified. For example, the clockwise circular gesture command described with respect to FIG. 2 might correspond to an instruction to increase the zoom level of the remote information input interface on the display screen, while a counter-clockwise circular gesture, in which the direction of the motion is reversed, could result in an instruction to decrease the zoom level. Many such combinations will occur to a developer of computer applications or other signal processing systems. An updated display screen results, and is shown in subsequent iterations of the method. In practice the process iterates so long as the remote device is active or some error occurs.

The method then terminates at a final step 116.

Alternative Embodiments

In some embodiments, the circular gestures comprise requiring at least one complete circle to be performed by the control entity before the zoom level is changed. In alternative embodiments, multiple control entities are used to perform the specialized gesture. For example, the zoom command may be input using a second hand (not shown) to complement hand 16 (FIG. 1). Once remote device 18 recognizes the second hand by analyzing input from sensing device 12, movement of the second hand farther away from hand 16 may be interpreted as the zoom command to increase the zoom level, and vice versa. Using multiple control entities may provide an advantage wherein pointer 24 is not moved prior to the change in zoom level. Thus, the changes in magnification may be performed around pointer 24.

In variants of the embodiments of FIG. 6 and FIG. 7, language model 132 is used to assign a probability to each letter on remote information input interface 26. Device 18 may order the letters accordingly, displaying the letters in a continuous ungrouped series of individual letters, rather than in groups, e.g., the group of three letters displayed in emphasized symbol button 76. Device 18 may invite access to letters on the display having relatively high probabilities, e.g., by presenting them in closer proximity to the center of remote information input interface 26. Alternatively, letters having relatively high and low probabilities may be grouped together and placed into secondary symbol arcs (not shown).

In yet another variant, the spatial distribution of letters in a symbol arc may reflect their respective probabilities. Thus, letters having relatively high and low probabilities of selection may be spaced apart and crowded together, respectively, in varying degrees.

Other commercial methods for remote information input may be used in conjunction with the specialized gestures and command interpretation by remote devices using three-dimensional sensing described hereinabove. For example, concepts described by the MessagEase™ text input system, available for sale at the MessagEase web site (exideas.com), may be enhanced accordingly.

In an alternative embodiment (not shown specifically in the figures), text input created by the user is shown as a linear stream of characters running across the screen, from left to right, for example. The user may perform a special gesture, recognized by the remote device, to mark a neutral reference position. Movement of the user's hand in a direction along the sequence, such as to the right of the reference position will then cause the display to advance to the right along the text stream whereas movement to the left will scroll backward through the text stream. The scroll speed presented by the remote device on the display may initially be slow when the user gestures sideways to the right or left and may gradually accelerate the longer the user's hand is in the advance or reverse position. As the text stream advances, the above-mentioned language model may be used to display alternative choices of additional characters and even words to append to the stream. These choices may be displayed above and/or below the existing line of characters, with the likeliest choices typically vertically closest to the line and possibly magnified. The user selects the desired choice by upward and downward motions of the hand, perpendicular to the direction of the text sequence. Thus, following the initial special gesture, the user can add text quickly and efficiently using simple right/left and up/down motions.

The user's right/left and up/down hand motions may be made in a generally planar space or, if the elbow is resting on a surface as in some of the embodiments described above, may be over a generally spherical surface. In either case, the right/left and up/down motions are not limited to a two-dimensional plane, but may be mapped to a two-dimensional coordinate system by the remote device. Within this latter coordinate system, one dimension of hand movement controls the speed of scrolling forward and back (wherein backward movement may delete characters previously appended to the stream), while the other dimension controls the selection of new characters.

This sort of embodiment may be used to present and add text input in a sort of continuous "flight mode": As the user scrolls to the right (forward) to add text to the stream being created, various potential continuations of the existing text are presented to the right of the existing text, above and/or below the text line. The potential continuations may be ordered or otherwise presented in such a way that the effort necessary to select a given continuation is a decreasing function of the likelihood that the given continuation is the correct one, based on the language model (higher likelihood yields lower effort). For example, likelier continuations may be presented with larger size and/or in closer proximity to the current cursor position.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

The invention claimed is:

1. A method for operating a computerized system, comprising the steps of:
   presenting user interface elements on a display screen of the computerized system;
   detecting a first gesture made in a three-dimensional space by a distal portion of an upper extremity of a user while a segment of the distal portion thereof rests on a surface, while mapping a three-dimensional location of the distal portion of the upper extremity to two parameters of a two-dimensional parametric surface, which is a section of a sphere that corresponds to possible locations of the distal portion of the upper extremity while the segment of the distal portion rests on a surface;
   responsively to the first gesture, identifying an area of the display screen selected by the user and displaying a corresponding user interface element by mapping the two parameters to corresponding parameters in a planar two-dimensional coordinate system of the display screen where the user interface elements are located; and
   after displaying the corresponding user interface element, detecting a second gesture made by the distal portion while the segment continues to rest on the surface so as to select one of the user interface elements that appears in the selected area.

2. The method according to claim 1, further comprising mapping an operation to the corresponding user interface element, wherein the second gesture causes the operation to be performed.

3. The method according to claim 1, wherein the first gesture describes a first arc-like movement forming at least a portion of a horizontal circular arc mapped to the section of the sphere as a pointing command and wherein the second gesture comprises a second arc-like movement mapped to the section of the sphere as a selection command.

4. The method according to claim 3, wherein the pointing command comprises pointing to a letter on the display screen and wherein the selection command comprises inputting the letter to the system.

5. The method according to claim 4, wherein a threshold is defined, and comprising displaying a subset of letters when a magnitude of the arc-like movement is less than the threshold and inputting the letter when the magnitude of the arc-like movement is greater than the threshold.

6. The method according to claim 5, wherein the subset of letters is shifted on the display screen using a language model to determine a probability of a preferred letter, and wherein inputting the letter is performed in a continuous motion.

7. The method according to claim 1, wherein the segment of the distal portion comprises an elbow.

8. The method according to claim 1, wherein the distal portion comprises a wrist.

9. The method according to claim 1, wherein of the distal portion comprises a forearm.

10. Apparatus for operating a computerized system, the apparatus comprising:
    a sensing device, which is configured to detect at least a distal portion of an upper extremity of a user;
    a display screen, which is configured to present user interface elements; and
    a processor, which is coupled to the sensing device so as to detect a first gesture made in a three-dimensional space by the distal portion of the upper extremity of the user while a segment of the distal portion thereof rests on a surface, while mapping a three-dimensional location of the distal portion of the upper extremity to two parameters of a two-dimensional parametric surface, which is a section of a sphere that corresponds to possible locations of the distal portion of the upper extremity while the segment of the distal portion rests on a surface, and to identify, responsively to the first gesture, an area of the display screen selected by the user and displaying a corresponding user interface element by mapping the two parameters to corresponding parameters in a planar two-dimensional coordinate system of the display screen where the user interface elements are located, and after displaying the corresponding user interface element, to detect a second gesture made by the distal portion while the segment continues to rest on the surface so as to select one of the user interface elements that appears in the selected area.

11. The apparatus according to claim 10, wherein the processor is further configured to map an operation to the corresponding user interface element, wherein the second gesture causes the operation to be performed.

12. The apparatus according to claim 10, wherein the first gesture describes a first arc-like movement forming at least a portion of a horizontal circular arc mapped to the section of the sphere as a pointing command and wherein the second gesture comprises a second arc-like movement mapped to the section of the sphere as a selection command.

13. The apparatus according to claim 12, wherein the pointing command comprises pointing to a letter on the display screen and wherein the selection command comprises inputting the letter to the system.

14. The apparatus according to claim 13, wherein a threshold is defined, and the processor is configured to display a subset of letters when a magnitude of the arc-like movement is less than the threshold and inputting the letter when the magnitude of the arc-like movement is greater than the threshold.

15. The apparatus according to claim 14, wherein the subset of letters is shifted on the display screen using a language model to determine a probability of a preferred letter, and wherein inputting the letter is performed in a continuous motion.

16. The apparatus according to claim 10, wherein the segment of the distal portion comprises an elbow.

17. The apparatus according to claim 10, wherein the segment of the distal portion comprises at least one of a wrist and a forearm.

18. A computer software product for operating a computerized system, comprising a non-transitory computer storage medium in which computer program instructions are stored, which instructions, when executed by a computer, cause the computer to present user interface elements on a display screen of the computerized system, to detect a first gesture made in a three-dimensional space by a distal portion of an upper extremity of a user while a segment of the distal portion thereof rests on a surface, while mapping a three-dimensional location of the distal portion of the upper extremity to two parameters of a two-dimensional parametric surface, which is a section of a sphere that corresponds to possible locations of the distal portion of the upper extremity while the segment of the distal portion rests on a surface, and to identify, responsively to the first gesture, an area of the display screen selected by the user and displaying a corresponding user interface element by mapping the two parameters to corresponding parameters in a planar two-dimensional coordinate system of the display screen where the user interface elements are located, and after displaying the corresponding user interface element, to detect a second gesture made by the distal portion while the segment continues to rest on the surface so as to select one of the user interface elements that appears in the selected area.

\* \* \* \* \*